US008521602B2

(12) United States Patent
Pulnikova

(10) Patent No.: US 8,521,602 B2
(45) Date of Patent: Aug. 27, 2013

(54) SYSTEM AND METHOD OF GLOBAL ELECTRONIC MARKET OF EDUCATIONAL SERVICES IN THE INTERNET

(75) Inventor: Valentina Pulnikova, Villingen-Schwenningen (DE)

(73) Assignee: Valentina Pulnikova, Villingen-Schwenningen (DE)

(*) Notice: Subject to any disclaimer, the term of this patent is extended or adjusted under 35 U.S.C. 154(b) by 1688 days.

(21) Appl. No.: 11/766,169

(22) Filed: Jun. 21, 2007

(65) Prior Publication Data
US 2008/0319804 A1 Dec. 25, 2008

(51) Int. Cl.
*G06Q 30/00* (2012.01)

(52) U.S. Cl.
USPC .................................. 705/26.1; 705/27.1

(58) Field of Classification Search
USPC ........................................... 705/26, 27
See application file for complete search history.

(56) References Cited

U.S. PATENT DOCUMENTS

| | | | |
|---|---|---|---|
| 4,793,813 A | 12/1988 | Bitzer et al. | |
| 6,895,214 B2 | 5/2005 | Murphy | |
| 6,987,945 B2 | 1/2006 | Corn et al. | |
| 6,988,138 B1 | 1/2006 | Alcorn et al. | |
| 2002/0087599 A1* | 7/2002 | Grant et al. | 707/513 |
| 2002/0116253 A1* | 8/2002 | Coyne et al. | 705/10 |
| 2002/0161719 A1* | 10/2002 | Manning et al. | 705/64 |
| 2004/0138913 A1* | 7/2004 | Guerra | 705/1 |
| 2004/0161734 A1* | 8/2004 | Knutson | 434/335 |
| 2008/0014569 A1* | 1/2008 | Holiday et al. | 434/351 |

OTHER PUBLICATIONS

Petersons.com: Internet Archive Wayback Machine, www.archive.org; www.petersons.com; 2006; 36pgs.*
ISCED: International Standard Classification of Education 1997; UNESCO 49pgs.*
Lebduska, Lisa: "College prep sites: your online counselors," Technology and Learning, Apr. 2001, v21i9pg13; Proquest #71409056, 7pgs.*

* cited by examiner

Primary Examiner — Rob Pond

(57) ABSTRACT

A system and a method of global electronic market of educational services in the Internet are provided. The method of operating a global electronic market of educational services for consumers of educational services and educational establishments via the Internet includes registering the consumers of educational services and the educational establishments; providing information regarding offers of the consumers of educational services and the educational establishments to the registered consumers of educational services and educational establishments accordingly; selecting partners in the market of educational services based on the provided information; holding competitions for student's vacancies; conducting contracts between consumers of educational services and educational establishments; providing additional services of the system of global electronic market of educational services.

1 Claim, 13 Drawing Sheets

SYSTEM AND METHOD OF GLOBAL ELECTRONIC MARKET OF EDUCATIONAL SERVICES IN THE INTERNET

FIELD OF INVENTION

This invention relates to the electronic market of educational services and in particular to the global electronic market of educational services in the Internet.

BACKGROUND OF INVENTION

1. Description of the Related Art

At present the Internet has become one of the most popular ways for finding information about educational services.

There are many universities' Web sites and Web sites of other educational establishments where the full information about this university or another educational establishment is given.

There are some Web sites giving information about universities in the world, such as www.braintrack.com, www.ezilon.com, http://univ.cc, www.bulter.nl, www.unesco.org, http://abitur.nica.ru and so on.

Characteristic features of these Web sites are:

availability of a list of foreign or national universities, a possibility to reach a Web site of a selected university.

The Web site http://abitur.nica.ru, created by specialists of Information Methodical Center of State Accreditation of Ministry of Education of Russian Federation, is the most similar to the proposed invention. It is possible in this site to select any needed speciality from the available list of specialities, any needed region and city, type of university (classical university, technical university, special university). After that, the site gives a list of educational establishments, offering education on the selected speciality. If you select any university from the received list, you will get information about the duration of education, the level of education required to be present prior to entering the considered educational establishment on the selected speciality, available forms of education (full-time attendance, distance learning, evening courses). Unfortunately, this site is limited to Russia and is not a global site. The site gives a list of specialities only and does not give any characteristics of specialities. The site gives information about high educational establishments, but does not provide information about other educational establishments, companies and private persons, offering educational services.

2. Problems

Analysis of patents and Web sites reveals the following main problems existing in the electronic market of educational services.

1. Some existing patents and Web sites are dealing with organization of educational process via the Internet and provide neither a global electronic market of educational services nor a necessary information support for the global electronic market of educational services.

2. Another part of the existing Web sites are information sites, which means that they simply propose a list of names of universities or other education establishments of high schools. In order to get specific information about proposed educational services it is needed to visit the site of some university. This procedure requires a lot of time. It is practically impossible to visit all the sites of all universities in order to define, which universities offers education on the required speciality. At the present time, it is impossible to get a list of educational establishments in the world, offering education on any considered speciality. Information about characteristics of required specialities is absent in any sites.

3. There is no generalized information in the Internet about specialised secondary educational establishments. There is also no information provided on educational establishments, giving training for blue-collar occupations, on universities or other company's refresher courses, on private persons and companies, which give education services.

4. Educational establishments, companies and private persons, offering education services, are not active participants of information sites. Therefore information on these sites is rarely changed.

5. Existing sites do not provide a frame for the educational market. Therefore there is no possibility for negotiations and conclusion of contracts on rendering of education services in the frame of these sites.

6. There is no world classification of kinds of education services, no world classification of specialities, no world classification of types of educational establishments, no world classification of forms of education, which does not give a possibility for creating a structured database of educational establishments, companies and private persons, offering educational services, and structured database of consumers of educational services.

7. There is no information in existing sites about private persons, looking for education services. Therefore educational establishments, companies and private persons, giving education services, cannot search for potential clients.

The suggested invention solves the abovementioned problems.

GLOSSARY

By "Consumers of educational services" we shall imply private persons and companies or other legal entities which require educational services.

By "Educational establishments" we shall imply universities and other educational establishments, companies and individual businessmen which offer educational services.

By the "Global Classification of Kinds of Education Services" (GCKES) we shall imply a Classification comprising the all the world known kinds of educational services and all the known levels of education (for example, general education, education on a bachelor, education on an engineer, education on a master, an advanced vocation training, a job training, a foreign language learning and so on). All divisions of classification have the name and a corresponding code.

By the "Global Classification of Specialities" (GCS) we imply a Classification, comprising the all the world known names of specialities and qualifications, given by Educational establishments, including main characteristics of every speciality and qualification. The Global Classification of Specialities represents treelike structure. Terminal branches of classification represent the name and a code of speciality or qualification.

By the "Global Classification of Forms of Education" (GCFE) we shall imply a Classification, comprising the all the world known forms of education (for example, a full-time education, an evening education, a distance education and so on). All divisions of classification have the name and a corresponding code.

By the "Global Classification of Types of Educational Establishments" (GCTEE) we shall imply a Classification, comprising the all the world known types of education establishments (for example, a classical university, a technical university, a specialised secondary educational establishment, a vocational-technical school and so on) with their main characteristics. All divisions of classification have the name and a corresponding code.

All of abovementioned classifications are located in a database of host server of a system of the global electronic market of educational services in the Internet.

SUMMARY OF THE INVENTION

A system and a method of the global electronic market of educational services via the Internet are proposed in this invention.

The system comprises a multilingual Web site or another network communication program, located on a host server, communication channels of the Internet and numerous computers of users. The users are private persons and companies, searching for educational services (Consumers of educational services), and educational establishments, companies and individual businessmen, offering educational services (Educational establishments), and both are the equitable participants of the process.

The method of the operation of the global electronic market of the educational services includes a registration block, an information block, a block of search and selection of a partner on the market of educational services, a block of competition for students' vacancies, a transaction block and a block of additional services of the system of the global electronic market of educational services.

After registration, users provide their offers. On the basis of these offers a database of educational establishments, companies and individual businessmen, offering educational services, and a database of private persons and companies, searching for educational services, are formed and stored on a host server.

The databases are formed on the basis of the Global Classification of Kinds of Education Service (GCKES), the Global Classification of Specialities (GCS), the Global Classification of Forms of Education (GCFE) and the Global Classification of Types of Educational Establishments (GCTEE).

The database of Educational establishments consists of the two main parts. The first part of the database of the Educational establishments is formed on the basis of data obtained during the registration procedure. This part of the also includes additional data about the users. The additional information includes country of location, type of the Educational establishment, kinds of rendered educational services, specialities and qualifications given by the Educational establishment, date of foundation of the Educational establishment, number of teachers and students, location address, picture of the Educational establishment, address of the Web site and so on. The second part of the database of the Educational establishment includes offers of the Educational establishment. This information is formed on the basis of data provided by the Educational establishments in the application form. These data for every speciality and qualification include kind of rendered educational service, a duration of education, a cost of education, a possibility of obtaining a scholarship, value of a scholarship, languages of education, accommodation of students (availability of student's hostels, a price of student's hostels or a private accommodation, availability of accommodation services). These data also contain additional data for every given speciality and qualification including additional demands for enrollees, additional information about education on this speciality and so on.

The database of Consumers of educational services also consists of two main parts. The first part of the database is formed on the basis of data obtained during the registration procedure. Another part of information about Consumers of educational services is formed on the basis of data provided by Consumers of educational services in the application form. These data represent a request of Consumers of educational services, including a kind of required educational service, a name of desired speciality and qualification, additional demands to Educational establishments further including: a country (state, land), city of location, a desired duration of education, a maximal cost of education, a possibility of obtaining a scholarship, a language of education and so on. These data also include additional information about private persons or Companies, searching for educational services. For private persons these data include a level of existing education, summary or average score of Certificate of Education, Curriculum Vitae (CV) and so on. For Companies these data include the name of juridical entity, the location address, directions of activities and so on.

Consumers of educational services and Educational establishments can access to this database and conduct needed searching. Consumers of educational services implement searching with the aim to find a needed Educational establishment, offering training of a required speciality and qualification. Educational establishments carry out searching with the aim to find suitable Consumers of educational services. Consumers of educational services and Educational establishments can perform different sorting of search results. Upon a request of a Consumer of educational services or an Educational establishment, a selection of suitable Educational establishments or Consumers of educational services can be made. A result of selection becomes available to the user.

After the analysis of the acquired information, the potential partners can negotiate in the frame of the system of the global electronic market of educational services or outside of it.

The Consumers of educational services and Educational establishments can conclude a contract for rendering educational services either in the frame of the system or outside the system. If the contract for rendering educational services is concluded within the system a number of typical contracts are offered. The contract is stored in the database for a stipulated time.

Besides, the system of electronic market of educational services offers holding a competition for students' vacancies.

The system of global electronic market of educational services further offers additional services including a regulations for the system of global market of educational services with examples of filling of all internal forms of the system, advisories and telephone consultations about operation of the system of the global market of educational services, juridical services for preparation and conclusion of contracts on rendering educational services, the analysis and prognosis of the global market of educational services, publication of the magazine with analysis of global electronic market of educational services.

DETAILED DESCRIPTION

Figure 1:
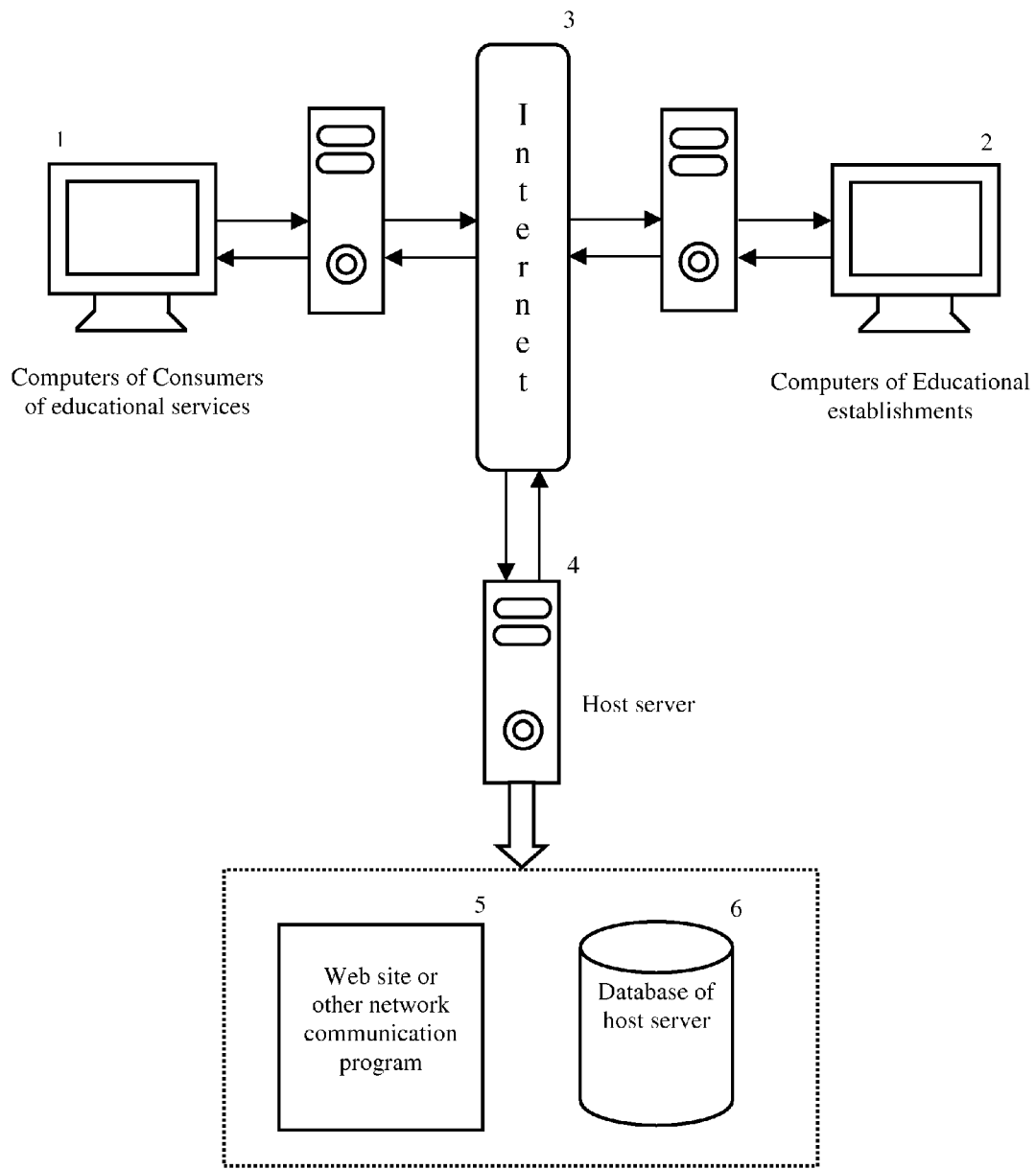
FIG. 1 is a principal scheme of the system of the global electronic market of educational services.

A system of the global electronic market of educational services for users including Consumers of educational services and Educational establishments (FIG. 1) comprises user computers of Consumers of educational services (1) and Educational establishments (2) interacting via the Internet (3) with a Web site or another network communication program (5) located on a host server (4); a database (6) including information about requests of Consumers of educational services and information about offers of Educational establishments and also including the Global Classification of Kinds of Education Services (GCKES), the Global Classification of Specialities (GCS), the Global Classification of Forms of Education (GCFE), the Global Classification of Types of Educational Establishments (GCTEE), located on the host server; and the Internet and/or other communication networks (3).

Users can access the Web site from their computers by means of the Internet Explorer or another Web browser. Consumers of educational services can acquire information about any speciality and get list of Educational establishments, which prepare specialists on this speciality. Educational establishments can acquire information about Consumers of educational services.

After entering the main page of the Web site a user can work either as a registered user or in a free access mode. In the free access mode the user can:
get acquainted with the rules of working within the system and access other official regulating documents of the system available in different world languages;
familiarize himself with the registration procedure;
familiarize himself with sections of Consumers of educational services and Educational establishments;
get familiar with the structure of the site, and so on.

The system grants an access neither to the data of Consumers of educational services or Educational establishments nor to the requests of Consumers of educational services and offers of Educational establishments for unregistered users.

Figure 2:
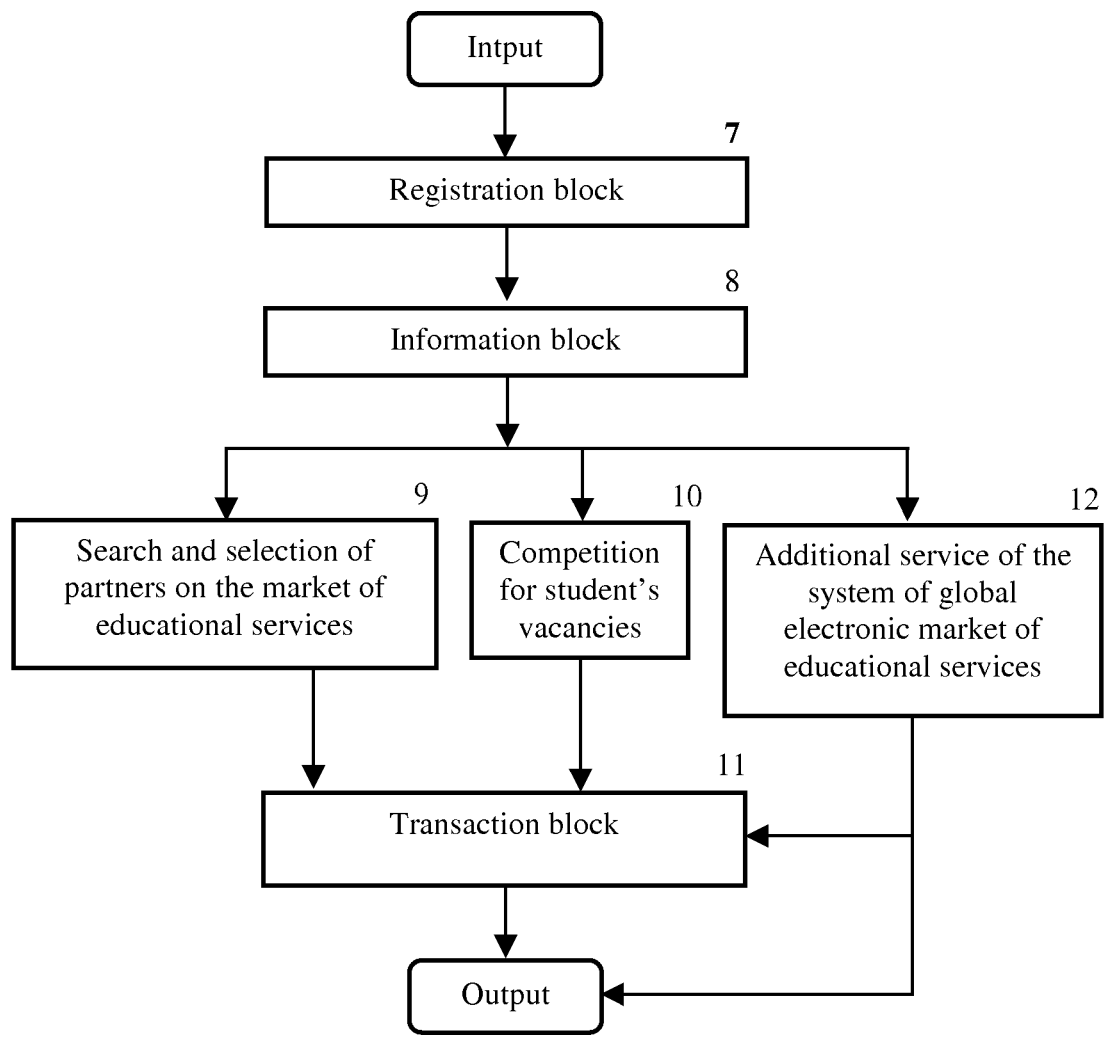
FIG. 2 is a principal scheme of the method of operation of the global electronic market of educational services.
Figure 4:
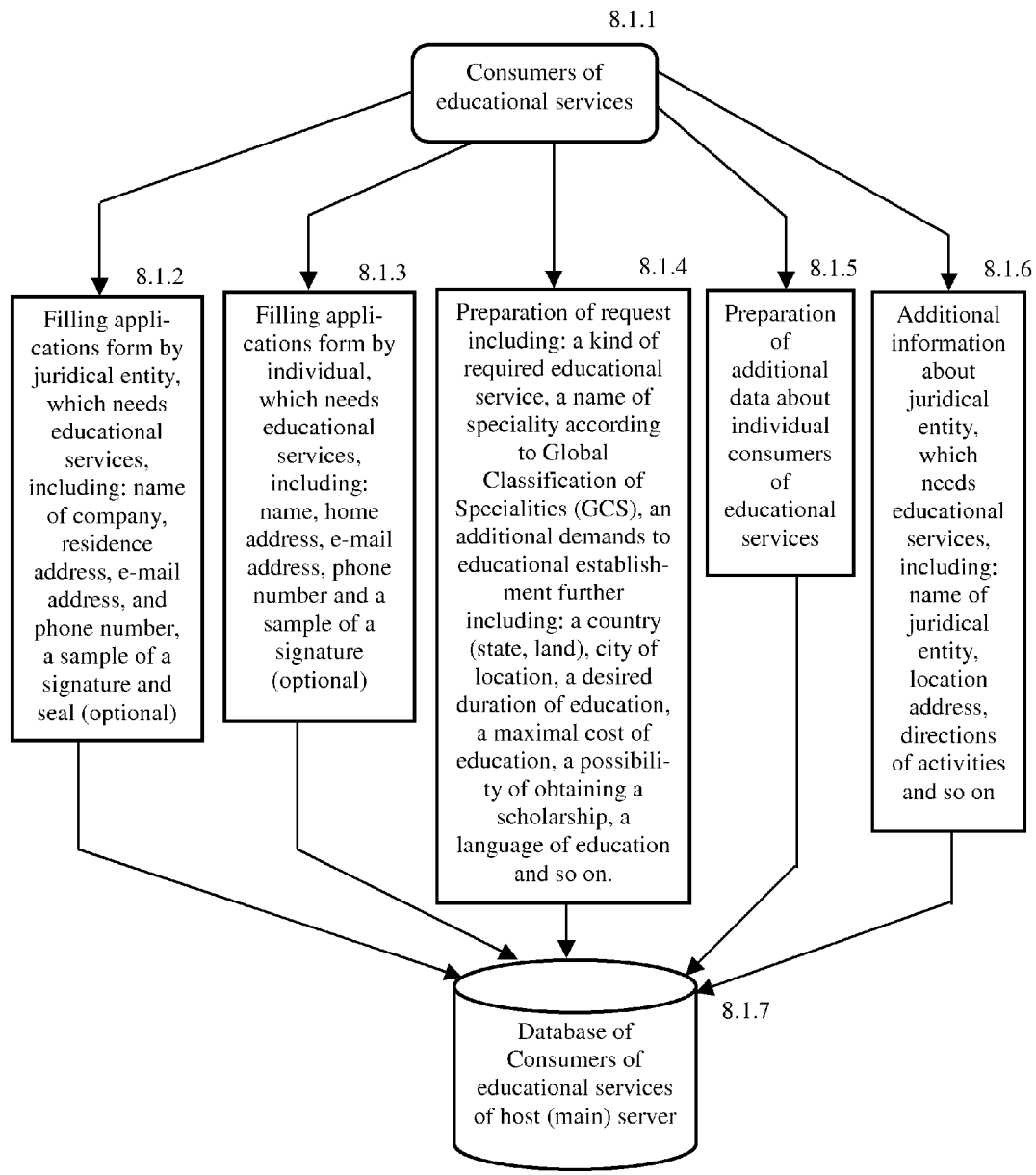
FIG. 4 discloses the process of creating the database of Consumers of educational services.
Figure 5:
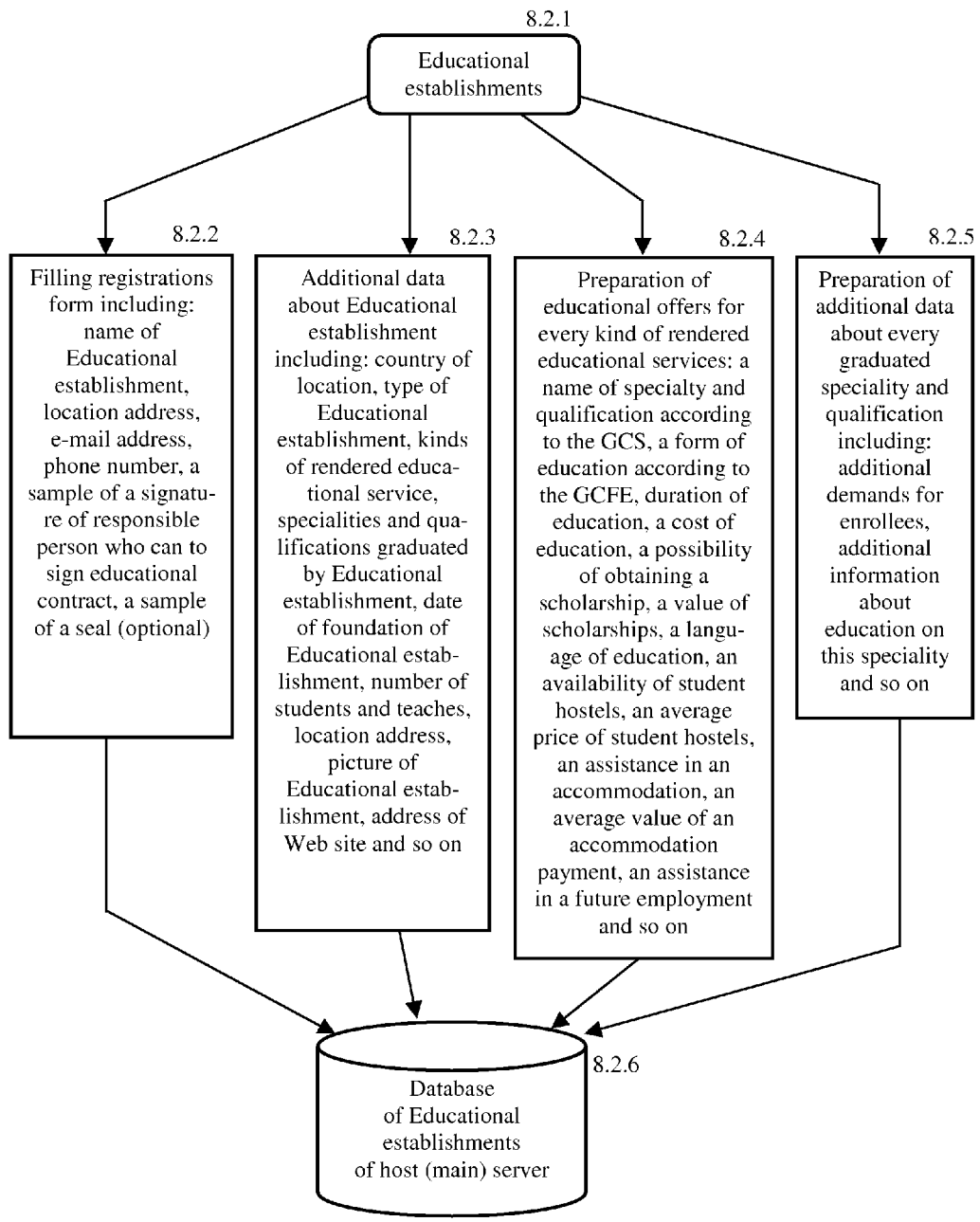
FIG. 5 discloses the process of creating the database of Educational establishments.
Figure 12:
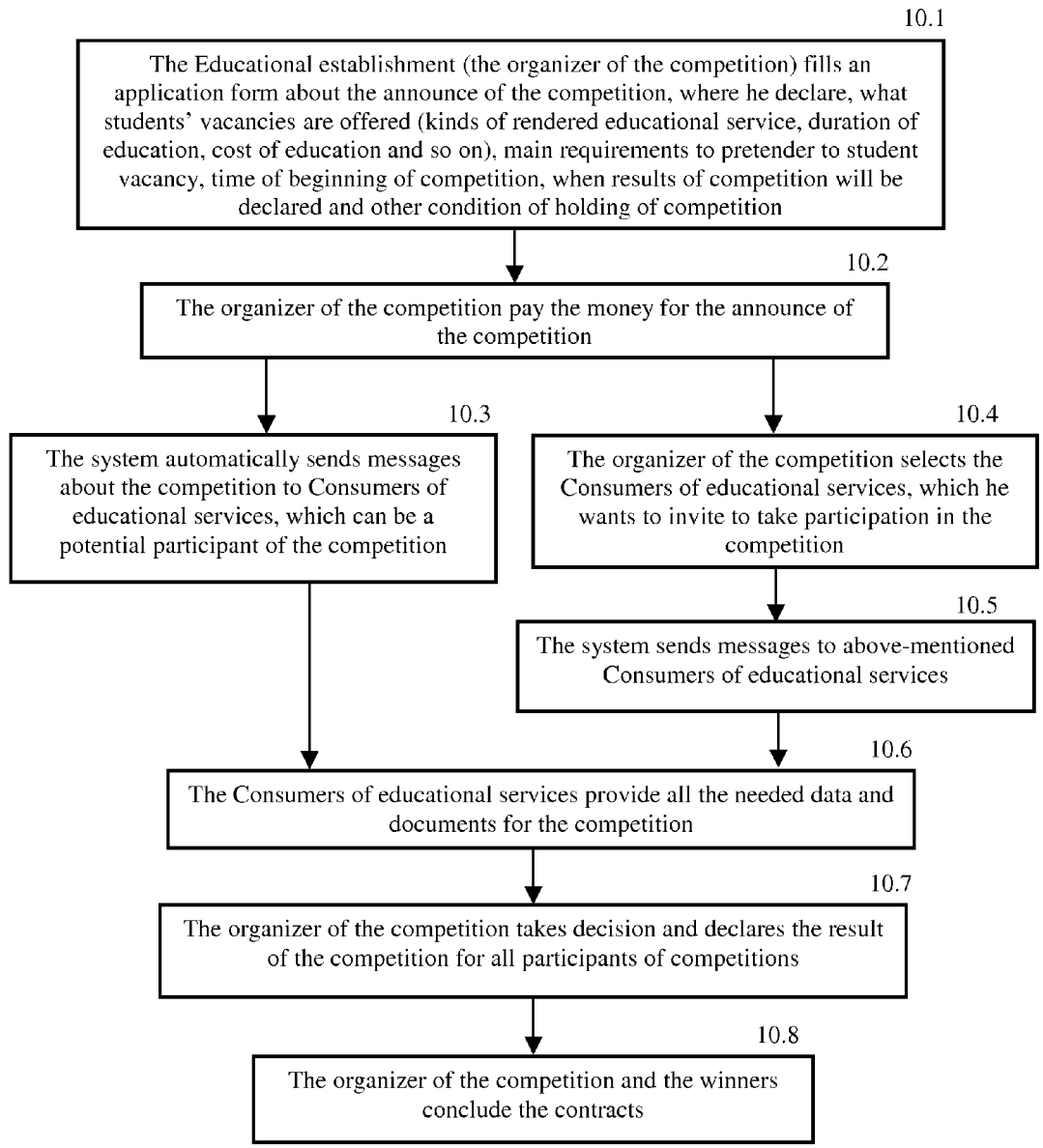
FIG. 12 shows a detailed description of the process of a competition for students' vacancies.
Figure 13:
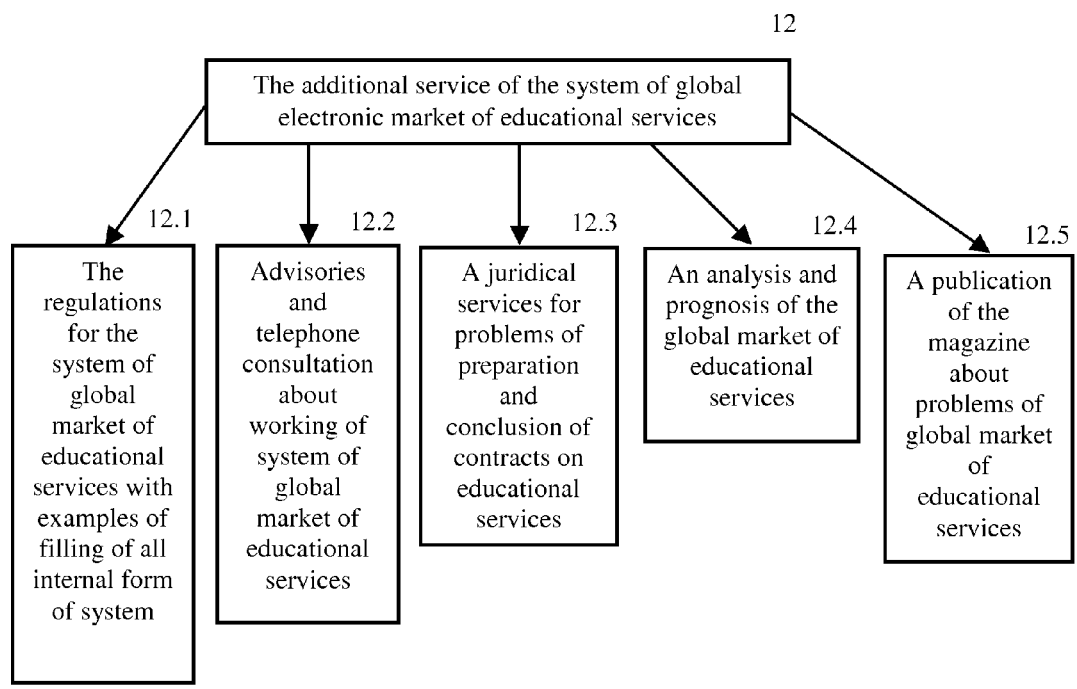
FIG. 13 shows additional services of the system of the global electronic market of educational services.

According to the invention, a method of operation of the global electronic market of educational services (FIG. 2) includes a registration block (7—see FIG. 3), an information block (8—see FIGS. 4 and 5), a block of search and selection of a partner on the market of educational services (9—see FIGS. 6-9), a block of competitions for students' vacancies (10—see FIG. 12), a transaction block (11—see FIGS. 10-11) and a block of additional services of the system of the global market of educational services (12—see FIG. 13).

Figure 3:
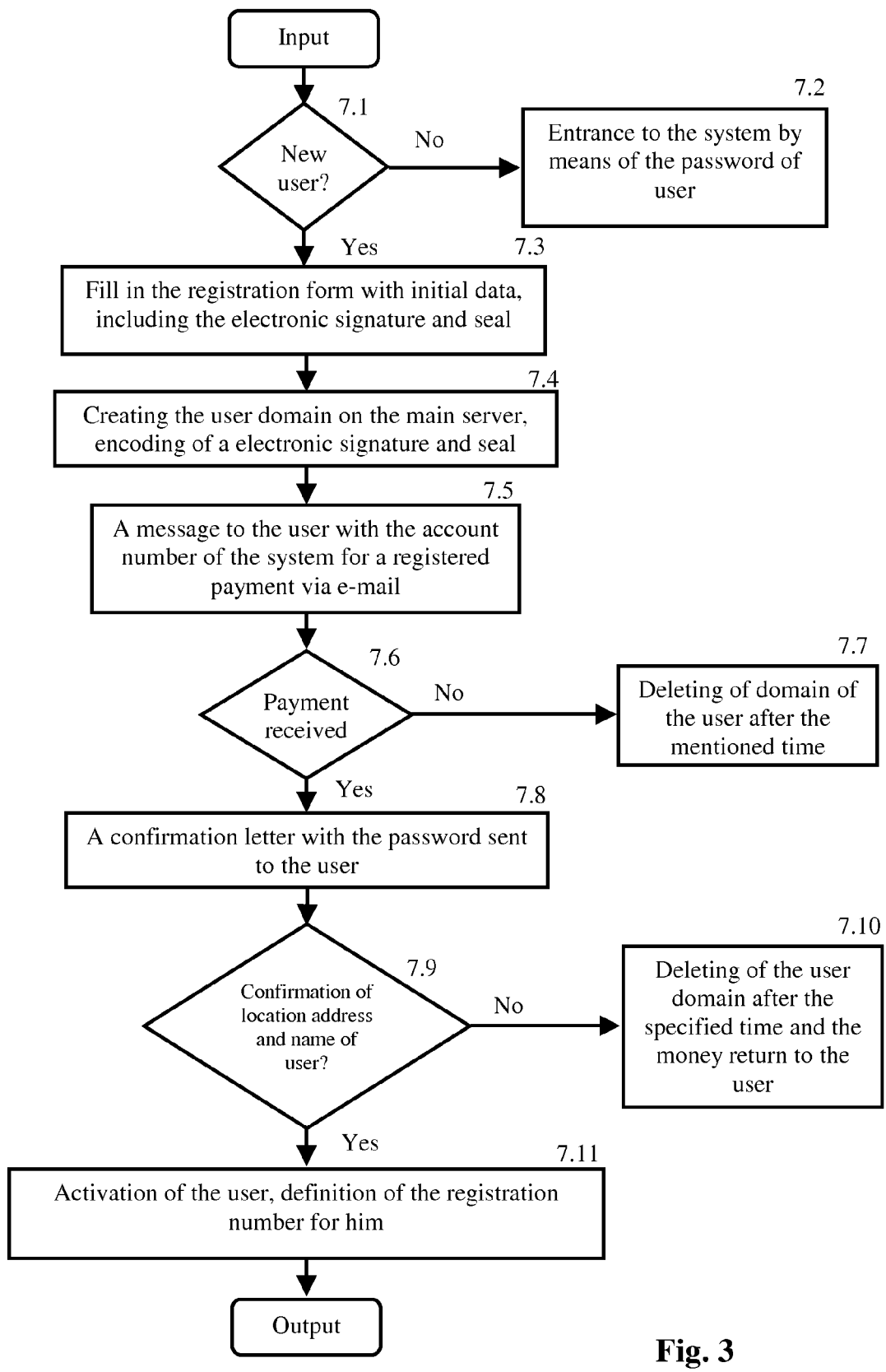
FIG. 3 is a detailed description of the registration block.

In order to register, the user must to enter to registration block (7.1-7.2, FIG. 3). (( )) The user must complete a registration form (7.3) (FIG. 3). This form includes data about a university or another educational establishment, or a company (or another legal entity): the name of the university or educational establishment, the name of the company or another juridical person, the location address, an e-mail address and a telephone number. If the user represents a university or other educational establishment, or a company, or another legal entity and the user wants to sign a contract on rendering educational services in the frame of the system of the global market of educational services or another documents of the system, he has to fill in the name and the position of his official representative, who will sign contracts and other official documents on behalf of the company or another juridical person. The university or another educational establishment, or the company, or another legal entity has to provide an example of the official scanned signature. Universities or other educational establishments, or companies having seals according to articles of association provide a sample of a scanned print of the seal.

If the user is an individual businessman, he/she includes his/her name in the registration form, the location address, an e-mail address and a telephone number. If the user is a private individual, he/she has to include his/her name in the registration form, the home address, an e-mail address and a telephone number.

If individual users want to sign contracts on rendering educational services and/or other official documents in the frame of system of the global market of educational services, they have to provide a scanned image of their signature.

Information, presented in registration forms, is considered confidential and will be unavailable. This information can be used for a contract preparation on rendering educational services and other official documents of the system of the global market of educational services. Upon a request of individual users, their name in the system of global market of educational services can be replaced by their registration number in the system, for example: "Individual businessman, registration number N" or "Private individual, registration number N".

The system allocates a user domain for a new user (7.4). In this domain all the user data will be stored. The system encodes the electronic signature and the seal of users.

Upon completion of the registration form by users, the system will send a message (7.5) to the provided e-mail address of the user with an account number, where the user must pay a registration fee. This fee is intended to discourage casual users who can potentially impede the normal operation of the system.

If no payment is received during a certain period after the registration (No, 7.6) then the system deletes the allocated user domain with all the data (7.7).

After receiving the registration fee (Yes, 7.6), a letter is sent to the user with the password by an express post (7.8) with a notification of the receipt. If users require so, the system will enclose with that letter a code of signature and a code of seal.

A confirmation (7.9) will be conducted. If no confirmation is acquired either of the user's location address as specified in the application form, or the company name or the name of the private person, the system locks the reserved user domain. If the user does not send a message to the system during a certain period, the system deletes a reserved user domain and returns the registration fee (7.10).

In case of confirmation of the user data, the system activates the user (7.11), his/her password and provides a registration number, which gives the user an access to the system of electronic market of educational services.

After filling the registration form the user concludes an agreement with the system. This way the user confirms his responsibility for any breach of the national and International laws.

A user as a juridical person will be able to modify the name of the company. A user as a private person can change his/her name. But in order to activate changes the user must repeat the registration procedure.

The information block includes the following databases. There are two main databases, namely the database of Consumers of educational services and the database of Educational establishments.

The database of Consumers of educational services (8.1.7) (FIG. 4) consists of two parts. The first part of the database of Consumers of educational services is formed on the basis of data obtained during the registration procedure (8.1.2-8.1.3). This information is considered confidential.

The second part of information about Consumers of educational services (8.1.1) is formed by them after the registration procedure (8.1.4-8.1.6). A Consumer of educational services fills data in the application form (8.1.4). These data include a required kind of educational service according to the Global Classification of Kinds of Education Services (GCKES), a required type of Education establishments according to the Global Classification of Types of Educational Establishments (GCTEE), a required form of education according to the Global Classification of Forms of Education (GCFE), a name of required speciality and qualification according to the Global Classification of Specialities (GCS). During the process of filling of the application form (8.1.4), the system of the global electronic market of educational services will offer to users a pop-up menu with Global Classification of Kinds of Education Services (GCKES), c Global Classification of Types of Educational Establishments (GCTEE), c Global Classification of Forms of Education (GCFE) and with Global Classification of Specialities (GCS). If the user wants to get an educational service without an acquiring any speciality, he/she can specify the required kind of education service only, for example: a preparatory course for the entrance examination to University, a learning of English, a course of householding and so on.

The user can specify additional demands to Educational establishments including: a country (state, land), a city of location, a desired duration of education, a maximal cost of education, a possibility of obtaining a scholarship, a language of education, availability of student hostels, an average price of student hostels, an assistance in accommodation, an average accommodation payment, an assistance in a future employment.

If a user wants to take participation in a competition for vacant student places in any Educational Establishments, he/she can specify desired Educational Establishments in the application form.

A user can find the exact name of a required speciality and qualification in GCS, codes, a short description and main characteristics of any speciality and qualification. A user can also familiarize with all the above mentioned Classifications, which will be available in main world languages.

Users can also specify additional information about themselves. For private persons these data (8.1.5) include the present level of education, a summary or average score of Certificate of Education, a scanned copy of Certificate of Education, a Curriculum Vitae (CV). The CV can contain all the additional information, which can be interesting for Educational Establishments. The system will give recommendations for the preparation of additional information for users. For Companies these data (8.1.6) include the name of juridical entity, the location address, directions of activities and so on. Companies can also present additional data about personnel, which will be learned.

The database of Educational Establishments (8.2.6) (FIG. 5) also consists of the two parts. The first part of the database of Educational Establishments is formed on the basis of data obtained during the registration procedure (8.2.2). This information is considered confidential.

Additional data (8.2.3) about the Educational establishment (( )) (8.2.1) include: the country of location, a type of Educational establishment according to the Global Classification of Types of Educational Establishments (GCTEE), kinds of rendered educational services according to the Global Classification of Kinds of Education Services (GCKES), a list of specialities and qualifications offered by the Educational establishment according to the Global Classification of Specialities (GCS), foundation date of the Educational establishment, the number of students and teachers, the location address, photographs of Educational establishment, address of Web site and so on. This information is available for the registered Consumers of educational services.

The second part of information is information about offered educational services by Educational establishment (8.2.4-8.2.5). This information is formed on the basis of data provided by Educational Establishments in the application form (8.2.4). These data include for every kind of rendered educational services: a name of specialty and qualification according to the Global Classification of Specialities (GCS), a form of education according to the Global Classification of Forms of Education (GCFE), a duration of education, a cost of education, a possibility of obtaining a scholarship, a value of scholarships, a language of education, an availability of student hostels, an average price of student hostels, an assistance in an accommodation, an average value of an accommodation payment, an assistance in a future employment. During the process of filling of the application form (8.2.4), the system of the global electronic market of educational services will offer to users a pop-up menu with the Global Classification of Specialities (GCS) and with the Global Classification of Forms of Education (GCFE).

Another part of information includes additional data about offered educational services an every given speciality and qualification comprising: additional demands for enrollees, including presence of the required basic education, correspondence to additional demands to a health and so on; additional information about education on this speciality, including a curriculum with a specification of all subjects and a number of hours studying per subject, availability of manufacturing practice and so on (8.2.5).

Consumers of educational services and Educational Establishments can introduce a modification into the abovementioned information. Users can change or delete information about their offers from the system at any time. They can also insert new offers at any time. Every user has a possibility to change only his/her own information.

Figure 6:
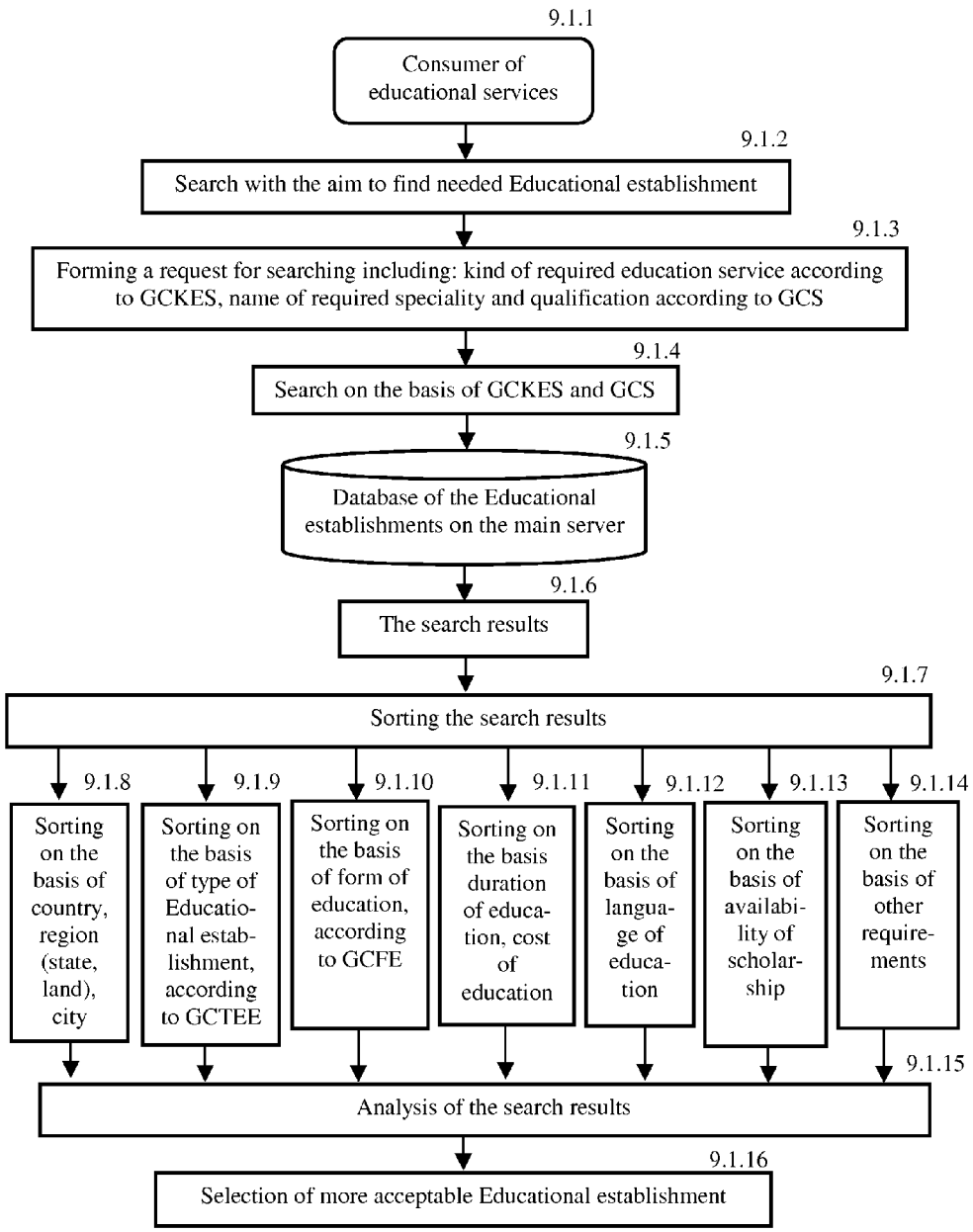
FIG. 6 discloses the process of searching for a suitable Educational establishment by a Consumer of educational services.

Consumers of educational services (9.1.1) can perform searching (9.1.2) with the aim to find needed Educational establishments, which graduate specialists for desired speciality and qualification (FIG. 6).

For searching Educational establishments the Consumer of educational services has to fill a special application form where he/she specifies the kind of education service according to GCKES, the name of required speciality and qualification according to GCS (9.1.3).

If the user does not want to get any speciality and wants to attend some course or use another kind of education, then the user only has to specify the kind of provided education service according to GCKES.

Searching is executed in the database of the offers of Educational establishments (9.1.5) on the basis of codes of Global Classification of Specialities (GCS) and of codes of Global Classification of Kinds of Education Services (GCKES) (9.1.4). Using Global Classification of Specialities (GCS) and the Global Classification of Kinds of Education Services (GCKES) for searching allows acceleration of the process of searching, increases the reliability of searching and provides compatibility of request of Consumers of educational services and offers of Educational establishments.

At a request of a Consumer of educational services, the system will give him/her all the information about offers of Educational establishments on the needed speciality, qualification and desired kind of educational service (9.1.6). Upon a completion of searching, the Consumer of educational services gets a list of available Educational establishments preparing specialists on a required speciality and qualification. An every position in this list will contain the following data: a country, a region (state, land), a city, where this education service is provided, a type of Education establishment according to GCTEE, a form of education according to GCFE, a duration of education on this speciality, a cost of education, an possibility of obtaining a scholarship, a language of education, availability of student hostels, an average price of student hostels, an assistance in accommodation, an average price of accommodation, an assistance in a future employment, additional data about the education on this speciality (curriculum, demands to enrollees and so on).

If the obtained list of search results is too large or, if a Consumer of educational services has an interest in specific offers of Education establishments only, then the Consumer of educational services can sort the obtained search results (9.1.7).

The Consumer of educational services can perform sorting of the obtained list or its part on the basis of the following approaches:
on the basis of a country, a region (state, land), a city (9.1.8),
on the basis of a type of Education establishment according to GCTEE (9.1.9),
on the basis of a form of education according to GCFE (9.1.10),
on the basis of a duration of education (9.1.11),
on the basis of a cost of education (9.1.11),
on the basis of a language of education (9.1.12),
on the basis of a possibility of obtaining a scholarship (9.1.13),
on the basis of availability of student hostels (9.1.14),
on the basis of an average price of student hostels (9.1.14);
on the basis of an assistance in accommodation (9.1.14),
on the basis of an average price of accommodation (9.1.14),
on the basis of an assistance in a future employment (9.1.14).

The user can specify only a part of conditions for sorting. If the number of limitations is smaller, he/she will get a longer list of results.

After the analysis of search results (9.1.15) the Consumer of educational services can get a list of more acceptable variants of Educational establishments (9.1.16).

Figure 7:
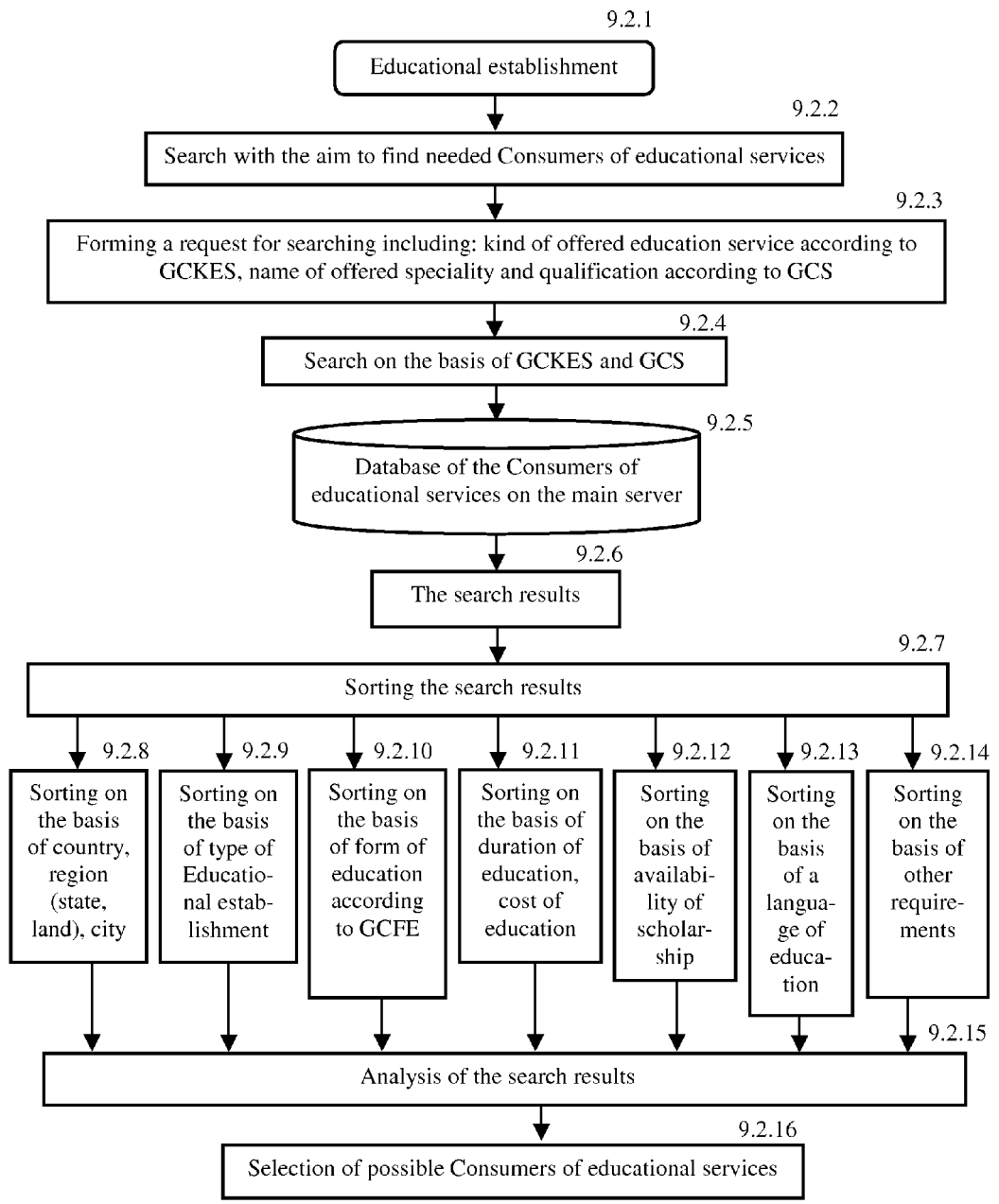
FIG. 7 discloses the process of searching for suitable Consumers of educational services by an Educational establishment.

Educational establishments (9.2.1) can conduct searching with the aim to find suitable Consumers of educational services (9.2.2) (FIG. 7). For a realisation of a search for Consumers of educational services, the Educational establishment has to fill a special application form where he specifies a kind of provided education service according to GCKES, a name of granted speciality and qualification according to GCS (9.2.3).

If the Educational establishment does not give any speciality and offers some course or another kind of education, then the Educational establishment just has to specify a kind of provided education service according to GCKES.

Searching is executed in the database of the Consumers of educational services (9.2.5) on the basis of codes of Global Classification of Specialities (GCS) and of codes of Global Classification of Kinds of Education Services (GCKES) (9.2.4).

Upon a request of the Educational establishment, the system will give him all the information about requests of Consumers of educational services on the considered speciality, qualification and the offered kind of education service (9.2.6).

An every request of Consumers of educational services in this list will contain the following data: a country (state, land), the city of location, a desired type of Educational establishment according to GCTEE, a desired form of education according to GCFE, a preferred duration of education, a desired maximal cost of education, a necessity of a scholarship, a language of education, a necessity of student hostels, a desired average price of student hostels, a necessity of assistance in accommodation, a desired average price of accommodation, a desired assistance in a future employment.

The Educational establishment can make sorting of the obtained list or a part of it on the basis of the following approaches:
on the basis of a country, a region (state, land), a city (9.2.8),
on the basis of a type of Educational establishment according to GCTEE (9.2.9),
on the basis of a form of education according to GCFE (9.2.10),
on the basis of a duration of education (9.2.11),
on the basis of a cost of education (9.2.11),
on the basis of a possibility of obtaining a scholarship (9.2.12),
on the basis of a language of education (9.2.13),
on the basis of availability of student hostels (9.2.14),
on the basis of an average price of student hostels (9.2.14);
on the basis of an assistance in accommodation (9.2.14),
on the basis of an average price of accommodation (9.2.14),
on the basis of an assistance in a future employment (9.2.14).

After the analysis of search results (9.2.15) the Educational establishment can get a list of more acceptable candidates for education (9.2.16).

Figure 8:
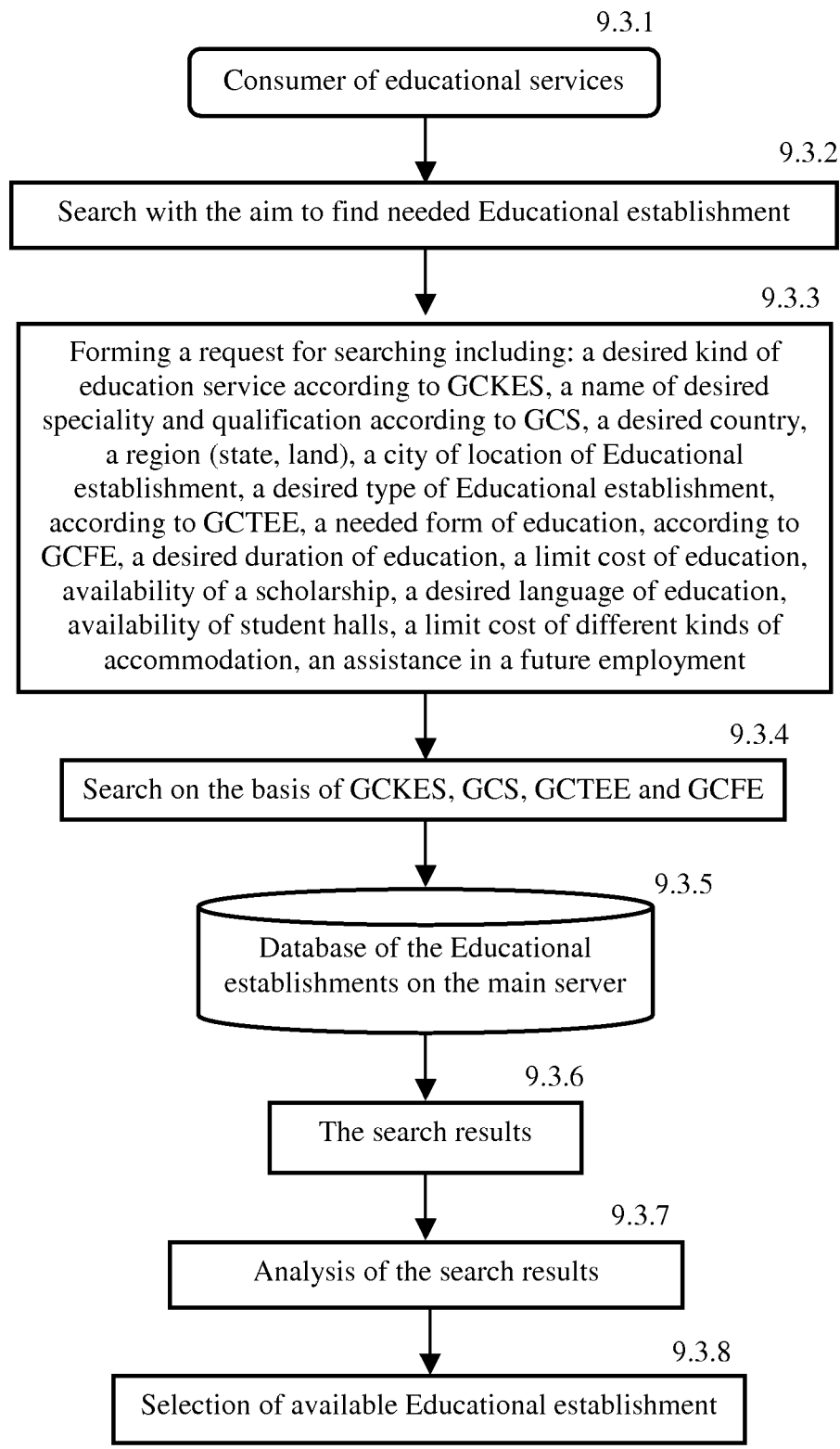
FIG. 8 discloses the process of searching for a suitable Educational establishment by a Consumer of educational services on the basis of an expanded request.
Figure 9:
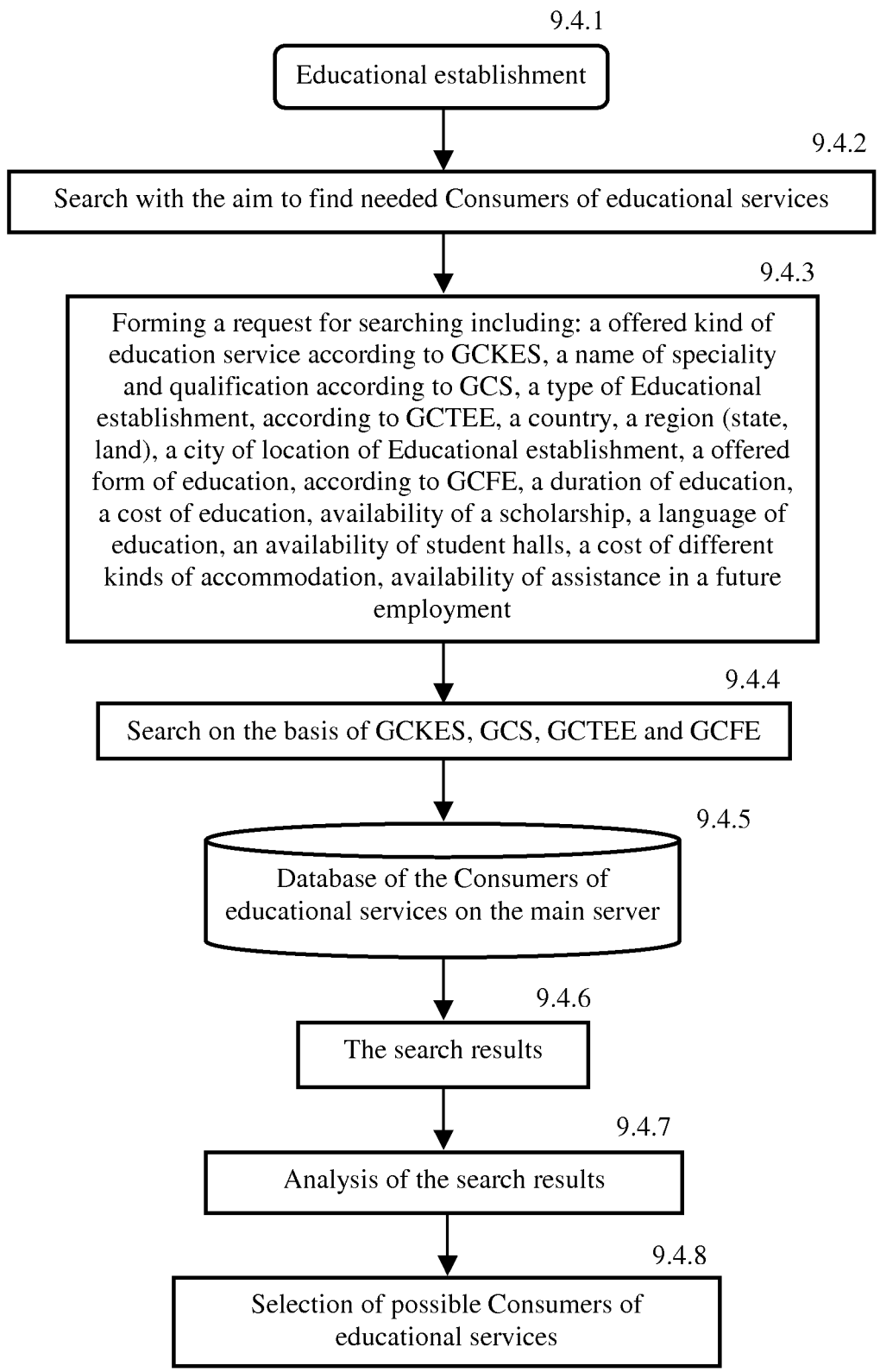
FIG. 9 discloses the process of searching for suitable Consumers of educational services by an Educational establishment on the basis of an expanded request.

Users can execute search on the basis of an expanded request (FIG. 8, FIG. 9). For such a search for a needed Educational establishments (9.3.2) a Consumer of educational services (9.3.1) must specify in the application form all the desirable data (9.3.3): a desired kind of education service according to GCKES, a name of desired speciality and qualification according to GCS, a desired country, a region (state, land), a city of location of Educational establishment, a desired type of Educational establishment, according to GCTEE, a needed form of education, according to GCFE, a desired duration of education, a maximal cost of education, availability of a scholarship, a desired language of education, availability of student hostels, a maximal cost of different kinds of accommodation, an assistance in a future employment.

Searching is executed in the database of the offers of Educational establishments (9.3.5) on the basis of codes of Global Classification of Kinds of Education Services (GCKES), of codes of Global Classification of Specialities (GCS), of codes of Global Classification of Types of Educational Establishments (GCTEE) and of codes of Global Classification of Forms of Education (GCFE) (9.3.4). Upon completion of the search the system provides a list of acceptable Educational establishments (9.3.6) or informs that there are no acceptable variants of Educational establishments found. After that the Consumer of educational services can fulfill the analysis of results of searching (9.3.7) and make a selection of available Educational establishment (9.3.8).

The Consumer of educational services can change initial data (9.3.3) for search and repeat the search. The Consumer of educational services is also allowed to specify only a part of initial data for searching.

The search on the basis of an expanded request can be carried out in the specified time by Consumer of educational services and be repeated a specified number of times.

For a search on the basis of an expanded request (9.4.2) of suitable Consumers of educational services the Educational establishment (9.4.1) must specify all the desirable data in the application form (9.4.3): an offered kind of education service according to GCKES, the name of speciality and qualification according to GCS, the type of the Educational establishment, according to GCTEE, the country, the region (state, land), the city of location of the Educational establishment, offered forms of education, according to GCFE, a duration of education, a cost of education, availability of a scholarship, a language of education, availability of student hostels, a price of different kinds of accommodation, availability of assistance in a future employment.

Searching is executed in the database of the Consumers of educational services (9.4.5) on the basis of codes of Global Classification of Kinds of Education Services (GCKES), of codes of Global Classification of Specialities (GCS), of codes of Global Classification of Types of Educational Establishments (GCTEE) and of codes of Global Classification of Forms of Education (GCFE) (9.4.4). Upon completion of the search the system provides a list of requests from Consumers of educational services (9.4.6) or informs that no Consumers of educational services fitting the requirements are found. After that the Educational establishment can fulfill the analysis of results of searching (9.4.7) and make a selection of possible Consumers of educational services (9.4.8).

The Educational establishment can change the initial data (9.4.3) for the search and repeat it. The Educational establishment can also specify only a part of initial data for searching.

The search on the basis of expanded request can be carried out in the specified time by the Educational establishment and is repeated a specified number of times.

Figure 10:
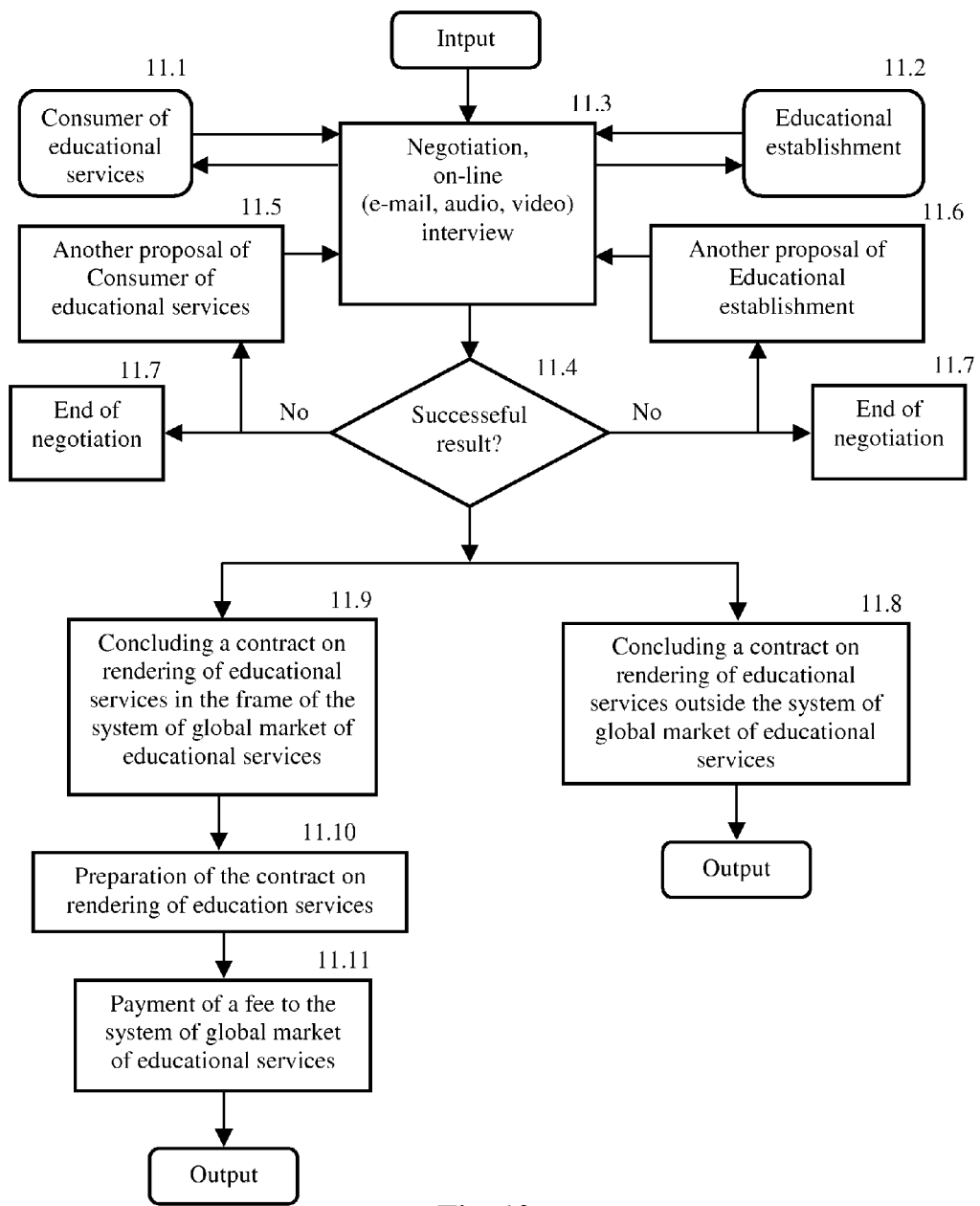
FIG. 10 shows a detailed description of the transaction block.

FIG. 10 describes the transaction block (11.1-11.11). Upon definition of potential partners in the system of the global electronic market of educational services, users (11.1, 11.2) can engage into negotiations on a possible conclusion of contracts on rendering educational services. They can negotiate on-line using provided audio or video services or internal e-mail of the system. Audio or video can be conducted through a special window in the system. Negotiations (11.3-11.7) can be conducted as an exchange of text or e-mail messages, or via telephone (11.3). If the result of negotiations is successful (11.4), the parties can prepare a contract on rendering educational services. The contract can be concluded in the frame of the system (11.9-11.11) or outside the system (11.8). If the contract is concluded in the frame of the system, the system records a debt to one of the partners, who will be named in the contract as the payer of the fee to the system.

Figure 11:
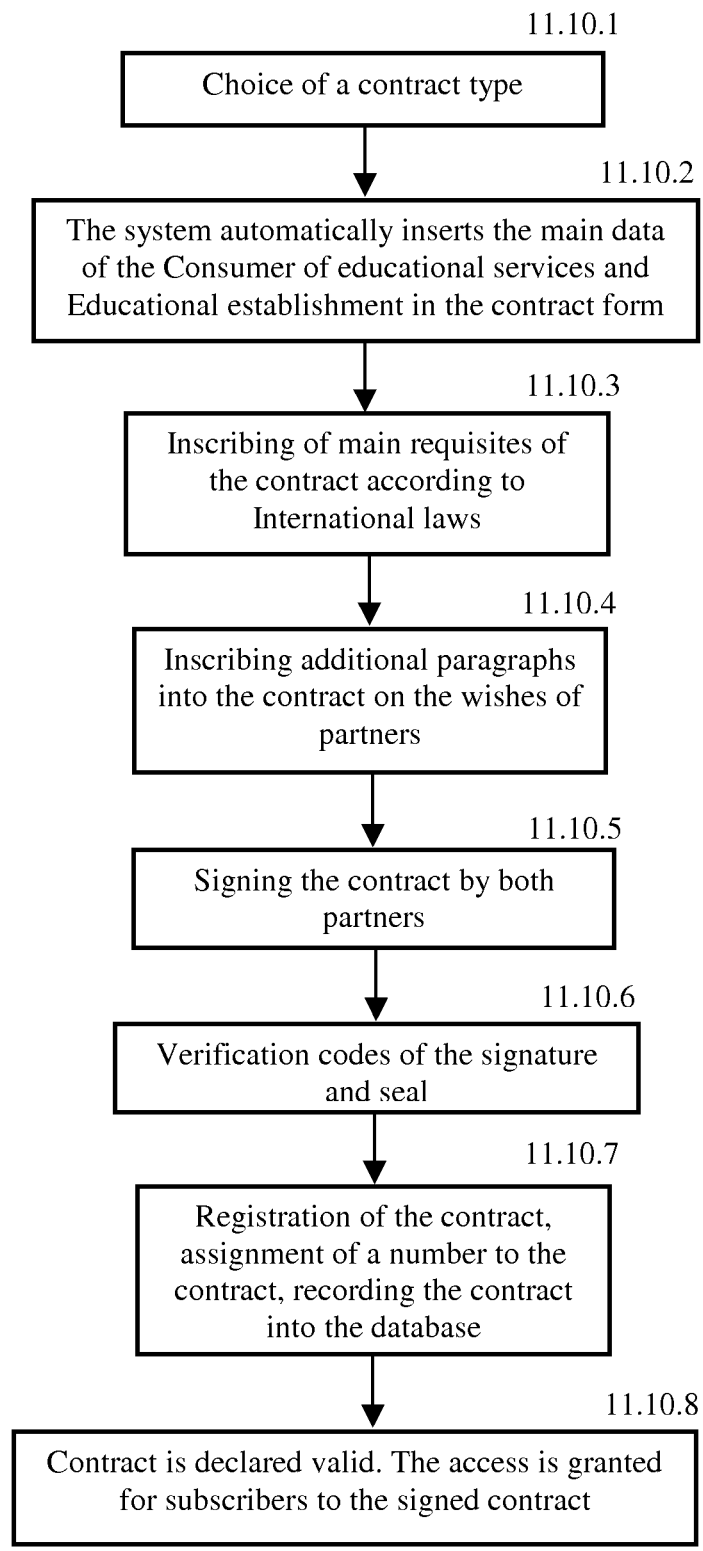
FIG. 11 shows a detailed description of the process of concluding contracts for rendering educational services.

FIG. 11 describes a process of preparing and concluding the contract on rendering educational services. The Educational establishment and the Consumer of educational services which decide to conclude a contract on rendering educational services in the frame of system of the global market of educational services, are able to choose a suitable type of the contract (11.10.1).

The system proposes different kinds of standard contracts on rendering educational services. Standard contracts on rendering educational services differ depending on: who will sign a contract (juridical entities or private persons), for what kind of educational service is signed contract and so on. The standard contracts on rendering educational services are prepared according to the International legal regulations. The standard contracts on rendering educational services include the main requisites, which have to be mentioned in the contract (11.10.3). The contract will not be registered in the system until these data is included. The system automatically inserts the main data about the Educational establishment and the Consumer of educational services in the contract form (11.10.2).

Partners can inscribe additional paragraphs into the contract (11.10.4). The system provides free recommendations from lawyers of the system about additional paragraphs of a contract on rendering educational services. Then the partners have to decide who will pay the fee to the system, and mention that in the contract. After that the partners insert electronic signature into the contract through entering corresponding codes in the special fields (11.10.5). The partner having a seal according to the article of associations must input the seal code in the determined place. After that the system verifies the introduced signature and seal codes (11.10.6). If all the data is valid, the system places scanned signatures and seals of each party into the determined places in the contract. After that the system registers the contract, assigns the number to the contract and records the contract into the database (11.10.7) without a possibility to insert any one-sided changes into the contract. After that the contract registration is declared valid. The both parties are granted an access to the contract (11.10.8) in order to be able to print it, store it in another location and so on.

The contract will be registered automatically only in case, if the both parties signed it, so none of the parties can reject the fact, that the contract was signed. This procedure increases the reliability of the contract. The system can confirm the conclusion of the contract in case of a conflict situation.

FIG. 12 describes the procedure of holding a competition for students' vacancies by Educational establishments. An Educational establishment (the organizer of the competition) fills the application form for an announcement of the competition, where it declares which students' vacancies are offered (a kind of rendered educational services according to GCKES, a form of education according to GCFE, a duration of education, a cost of education and so on), main requirements for a pretender to study places, time of beginning of competition, when results of competition will be declared and other conditions of holding the competition (10.1).

Then the Educational establishment, as the organizer of the competition, pays the money for the announcement of the competition (10.2).

There are two ways for notifying potential participants about the competition. In the first way the system automatically sends messages about the competition to potential participants on the basis of declared parameters via internal e-mail (10.3).

In the second way, the Educational establishment (the organizer of the competition) selects the Consumers of educational services himself (10.4). Then the system sends messages to invitees via internal e-mail (10.5). The potential participants of the competition are required to send all the needed data and documents for the competition to the organizer of the competition (10.6). After having analyzed these data the organizer of the competition takes a decision (10.7). Then the organizer declares the result of the competition, which he sends to the participants of the competition via the internal e-mail of the system (10.7). Finally, the organizer of the competition and the winners of the competition conclude contracts on rendering educational services in the frame of the system, or out of it (10.8).

FIG. 13 describes additional services of the system of global electronic market of educational services. These services include:
- regulations for the system of the global market of educational services with examples of filling of all internal forms of the system (12.1),
- advisories and telephone consultations about working of the system of the global market of educational services (12.2),
- juridical services for assistance with preparation and conclusion of contracts on rendering educational services (12.3),
- analysis and prognosis of the global market of educational services (12.4),
- a publication of the magazine about problems of the global market of educational services (12.5).

What is claimed is:

1. A method of operation of a global electronic market of educational services for Consumers of educational services and Educational establishments via the Internet, comprising the combination of steps:
   - registering the Consumers of educational services and the Educational establishments, which comprises, at least, filling a registration form for a subsequent check of data, provided by a user into the registration form, and for using these data for contract preparation and for the preparation of other official documents of the system of global electronic market of educational services;
   - creating a database of a Global Classification of Kinds of Education Services (GCKES), comprising names of kinds of educational services and levels of education and corresponding codes;
   - creating a database of a Global Classification of Specialities (GCS), representing by itself a treelike structure, where terminal branches of the tree, comprise names and corresponding codes of specialities and qualifications, including main characteristics of specialities and qualifications;
   - creating a database of a Global Classification of Forms of Education (GCFE), comprising names of forms of educational services and corresponding codes;
   - creating a database of a Global Classification of Types of Educational Establishments (GCTEE), comprising names of types of educational establishments, including their main characteristics, and corresponding codes;
   - creating a database of information about juridical entities, to which educational services are required, the data from which will be used for the preparation of contracts and other official documents, comprising the name of a company, a residence address, an e-mail address, a phone number, a sample of a signature of an official representative and seal of the company;
   - creating a database of information about individual users, to which educational services are required, the data from which will be used for the preparation of contracts and other official documents, comprising the name, a home address, an e-mail address, a phone number and a sample of a signature;
   - creating a database of information about requests of Consumers of educational services, comprising a required kind of educational services according to the Global Classification of Kinds of Education Services (GCKES), a name of a required speciality and qualification according to the Global Classification of Specialities (GCS), a required type of Education establishments according to the Global Classification of Types of Educational Establishments (GCTEE), a required form of education according to the Global Classification of Forms of Education (GCFE), a country (state, land), city of location of Educational Establishment, a desired duration of education, a maximal cost of education, a possibility of obtaining a scholarship, a language of education, availability of student hostels, an average price of student hostels, an assistance in accommodation, an average price of accommodation, an assistance in a future employment;
   - creating a database of additional information about private persons, to which educational services are required, comprising a level of the present education, a summary or an average score of Certificate of Education, a scanned copy of Certificate of Education, a Curriculum Vitae (CV);
   - creating a database of additional information about Companies or other juridical entities, to which educational services are required, comprising the name of juridical entity, a location address, directions of activities, a data about personnel which will be trained;
   - creating a database of information about Educational establishments, used for the preparation of contracts and other official documents, comprising the name of the Educational establishment, a location address, an e-mail address, a phone number, a sample of a signature of the responsible person who can sign a contract, a sample of the Educational establishment's seal;
   - creating a database of additional information about Educational establishments, comprising a country of location, a type of the Educational establishment according to the Global Classification of Types of Educational Establishments (GCTEE), kinds of rendered educational services according to the Global Classification of Kinds of Education Services (GCKES), a list of specialities and qualifications given by the Educational establishment according to the Global Classification of Specialities (GCS), the date of foundation of the Educational establishment, the number of students and teachers, the location address, photographs of the Educational establishment, an address of a Web site;
   - creating a database of information about offered education services by Educational establishments, comprising for rendered educational services: a name of speciality and qualification according to the Global Classification of Specialities (GCS), a form of education according to the Global Classification of Forms of Education (GCFE), a duration of education, a cost of education, a possibility of obtaining a scholarship, a value of a scholarship, a language of education, availability of student hostels, an average price of student hostels, an assistance in accommodation, an average price of accommodation, an assistance in a future employment;

creating a database of additional information about specialities and qualifications, comprising additional requirements for enrollees, availability of a required basic education for enrollees, correspondence of enrollees to additional requirements for health, additional information about education on this speciality, a curriculum with a specification of all the subjects, number of studying hours per subject, availability of a manufacturing practice;

forming a simple request for searching for required Educational establishments by Consumers of educational services, which comprises a kind of required education service according to the Global Classification of Kinds of Education Services (GCKES) and the name of required speciality and qualification according to the Global Classification of Specialities (GCS);

searching for required Educational establishments by Consumers of educational services on the basis of the simple request, which comprises searching of required information from the database of information about offered education services on the basis of codes of the Global Classification of Kinds of Education Services (GCKES) and on the basis of codes of the Global Classification of Specialities (GCS); and sorting of obtained search results, wherein this sorting comprises: sorting on a basis of a country, a region (state, land), a city; sorting on a basis of a type of Education establishment; sorting on a basis of a form of education; sorting on a basis of a duration of education; sorting on a basis of a cost of education; sorting on a basis of a language of education; sorting on a basis of availability of obtaining a scholarship; sorting on a basis of availability of student hostels; sorting on a basis of an average price of student hostels; sorting on a basis of an assistance in accommodation; sorting on a basis of an average price of accommodation; sorting on a basis of an assistance in a future employment;

forming an expanded request for searching for required Educational establishments by Consumers of educational services, which comprises a preferred kind of education service according to the Global Classification of Kinds of Education Services (GCKES), a name of the preferred speciality and qualification according to the Global Classification of Specialities (GCS), a preferred country, a region (state, land), a preferred city of location of Educational establishment, a desired type of Educational establishment, according to the Global Classification of Types of Educational Establishments (GCTEE), a required form of education, according to the Global Classification of Forms of Education (GCFE), a desired duration of education, a maximal cost of education, a possibility of obtaining a scholarship, a language of education, availability of student hostels, an average price of student hostels, an assistance in accommodation, an average price of accommodation, an assistance in a future employment;

searching for required Educational establishments by Consumers of educational services from the database of information about offered education services on the basis of an expanded request;

forming a simple request for searching for required Consumers of educational services by Educational establishments, which comprises a kind of offered education service according to the Global Classification of Kinds of Education Services (GCKES) and the name of offered speciality and qualification according to the Global Classification of Specialities (GCS);

searching for required Consumers of educational services by Educational establishments from the database of information about requests of Consumers of educational services on the basis of a simple request, which comprises searching required information on the basis of codes of the Global Classification of Kinds of Education Services (GCKES) and on the basis of codes of the Global Classification of Specialities (GCS); and sorting of obtained search results, wherein this sorting comprises: sorting on a basis of a country, a region (state, land), a city; sorting on a basis of a type of Education establishment; sorting on a basis of a form of education; sorting on a basis of a duration of education; sorting on a basis of a cost of education; sorting on a basis of a language of education; sorting on a basis of availability of obtaining a scholarship; sorting on a basis of availability of student hostels; sorting on a basis of an average price of student hostels; sorting on a basis of an assistance in accommodation; sorting on a basis of an average price of accommodation; sorting on a basis of an assistance in a future employment;

forming an expanded request for searching for required Consumers of educational services by Educational establishments, which comprises a kind of offered education service according to the Global Classification of Kinds of Education Services (GCKES), a name of speciality and qualification according to the Global Classification of Specialities (GCS), a type of Educational establishment, according to the Global Classification of Types of Educational Establishments (GCTEE), a country, a region (state, land), a city of location of Educational establishment, an offered form of education, according to the Global Classification of Forms of Education (GCFE), a duration of education, a cost of education, a possibility of obtaining a scholarship, a value of a scholarship, a language of education, availability of student hostels, an average price of student hostels, an assistance in accommodation, an average price of accommodation, an assistance in a future employment;

searching for required Consumers of educational services by Educational establishments from the database of information about requests of Consumers of educational services on the basis of an expanded request;

holding a competition for students' vacancies by Educational establishments, which comprises: filling the application form for an announcement of the competition, where the Educational establishment declares which students' vacancies are offered, kinds of rendered educational services according to the Global Classification of Kinds of Education Services (GCKES), forms of education according to the Global Classification of Forms of Education (GCFE), a duration of education, a cost of education, main requirements for a pretender on a student vacancy, time of beginning of the competition, when the results of the competition will be declared and other conditions of holding the competition; notification of the potential participants about the competition carried out either through automatic sending messages about the competition to the potential participants selected on the basis of the declared parameters, or by automatic sending messages about the competition to Consumers of educational services selected by the organizer of the competition; providing all the needed data and documents for the competition by Consumers of educational services; declaration of a result of the competition by means of publishing this result on a special page of the system of global electronic market of educational services exclusively available for the participants of the competition; and conclusion of the contract between the organizer and winners of the competition;

conducting transactions, which comprises: conducting negotiations; concluding a contract in case of a successful negotiation in the frame of the system of global electronic market of educational services, which, in turn, comprises: choosing a standard form of a contract, proposed by the system of global electronic market of educational services; automatic filling the main data about partners on the global electronic market of educational services into the form of the contract; filling main requisites into the contract according to the International legal regulations; filling additional paragraphs into the contract, if the users desires so; signing the contract with the electronic signature; sealing the contract with an electronic seal for the users having a seal according to articles of associations; verifying codes of the electronic signature and seal; automatic setting scanned signatures and seals of both parties in a specified location of the contract; automatic registration of the contract and storing the contract into the database without a possibility to introduce any one-sided changes into the contract; making the contract accessible for every party;

providing additional services by the system of global electronic market of educational services, which comprise: regulations of the system of global electronic market of educational services with examples of filling of all the internal forms of the system; advisories and telephone consultations about operation of the system of global electronic market of educational services; juridical services for the preparation and conclusion of the contracts on rendering educational services; analysis and prognosis of the global electronic market of educational services; a publication of a magazine about problems of the global electronic market of educational services.

* * * * *